United States Patent [19]

Usami et al.

[11] Patent Number: 4,634,233

[45] Date of Patent: Jan. 6, 1987

[54] METHOD OF FORMING A LIGHT SOURCE BY THE USE OF A REFRACTIVE INDEX DISTRIBUTION TYPE LENS AND LIGHT SOURCE DEVICE

[75] Inventors: Akihiro Usami, Tokyo; Mitsuhiro Tokuhara, Chigasaki, both of Japan

[73] Assignee: Canon Kabushiki Kaisha, Tokyo, Japan

[21] Appl. No.: 645,403

[22] Filed: Aug. 29, 1984

[30] Foreign Application Priority Data

Sep. 2, 1983 [JP] Japan ................... 58-162308

[51] Int. Cl.⁴ ................... G02B 3/00; G02B 6/00
[52] U.S. Cl. ................... 350/413
[58] Field of Search ................... 350/413

[56] References Cited

FOREIGN PATENT DOCUMENTS 1955964 11/1970 Fed. Rep. of Germany ....... 350/413

OTHER PUBLICATIONS

Paxton et al, "Aberrations and Design of Graded-Index (GRIN) Rods Used as Image Relays", *Applied Optics*, vol. 10, No. 9, 9/1971, pp. 2090–2096.

Kikuchi et al, "Graded-Index Sphere Lens with Hemispherical Rod Cladding", *Applied Optics*, vol. 21, No. 15, 8/1982, pp. 2734–2738.

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

In collimating the light beam from a light source by the use of a refractive index distribution type lens the refractive index of which on the optic axis is $n_0$ and the refractive index $n(r)$ of which at a position spaced by r from the optic axis is represented by $$n^2(r) = n_0^2 \{1 - (gr)^2 + h_4(gr)^4 + h_6(gr)^6 + h_8(gr)^8 + \ldots\}$$

where $g, h_4, h_6, h_8, \ldots$ are constants, instead of the terms $h_8(gr)^8$ and thereafter being controlled, the light beam in the marginal portion of the refractive index distribution type lens is blocked to thereby minimize aberrations.

5 Claims, 7 Drawing Figures

METHOD OF FORMING A LIGHT SOURCE BY THE USE OF A REFRACTIVE INDEX DISTRIBUTION TYPE LENS AND LIGHT SOURCE DEVICE

BACKGROUND OF THE INVENTION

1. Field of the Invention

This invention relates to a method of forming a light source by the use of a refractive index distribution type lens and to a light source device.

2. Description of the Prior Art

As a heterogeneous lens, there is known a radial index lens endowed with a heterogeneous refractive index distribution in the diametrical direction of the lens from the optic axis or an axial index lens endowed with a heterogeneous refractive index distribution in the direction of the optic axis. Of these lenses, the radial index lens is widely used and one such lens is known as the Celfoc lens (trade name). Herein, the term "refractive index distribution type lens" refers to this radial index lens.

In recent years, it has been known in the field of optical communications to use a refractive index distribution type lens as a collimater to collimate the light beam from a divergent light source such as a semiconductor laser. In this field of optical communications, it has not been necessary to strictly correct the aberration characteristic of the collimater lens. However, where this light source device is used in an instrument such as an optical head, a digital audio disc or LBP, it must be good with respect to aberrations. The refractive index $n(r)$ of a refractive index distribution type lens at a position spaced by r from the optic axis thereof, with the refractive index on the optic axis being $n_0$, is represented by $$n^2(r) = \{n_0^2 1 - (gr)^2 + h_4(gr)^4 + h_6(gr)^6 + h_8(gr)^8 + \ldots\} \quad (1)$$

where g is a value which determines the power of the heterogeneous paraxial amount and $h_i$ is a value related to the (i−1)th order aberration, and both of these are constants. Accordingly, in the refractive index distribution type lens, to effectively correct aberrations, the lens must be manufactured with the values up to high order h being controlled. However, it is very difficult to manufacture a lens with the values up to such high order h being controlled. Also, in the refractive index distribution type lens, as shown in FIG. 1 of the accompanying drawings, a light beam 2 is regularly reflected by the outer periphery 1a of the lens and it has often been the case that a ghost image or flare is created by the regularly reflected light beam 3.

SUMMARY OF THE INVENTION

In view of the above-noted disadvantages peculiar to the prior art, it is an object of the present invention to provide a method of and a device for forming a light source in which correction of aberrations is easy even by the use of a refractive index distribution type lens.

It is a further object of the present invention to provide a method of and a device for forming a light source in which ghost image can be substantially eliminated.

In the light source forming method and light source device according to the present invention, instead of not controlling the terms $h_8(gr)^8$ and so forth of the refractive index distribution type lens during manufacture, the diameter of the refractive index distribution type lens is made larger than the required diameter of the collimator light beam and part of the light beam passing through the marginal portion of the lens is intercepted to thereby achieve the above objects. The member for intercepting the light beam may be disposed on the light beam entrance side of the lens to intercept part of the light beam entering the lens, or may be disposed on the light beam exit side of the lens to intercept part of the light beam emerging from the lens.

The invention will hereinafter be described in detail by reference to the accompanying drawings.

DESCRIPTION OF THE PREFERRED EMBODIMENTS

Figure 1:
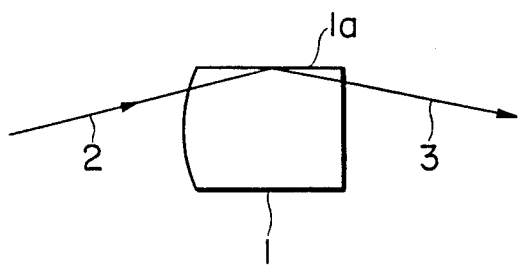
FIG. 1 shows the manner in which ghost light is created in a refractive index distribution type lens.
Figure 2:
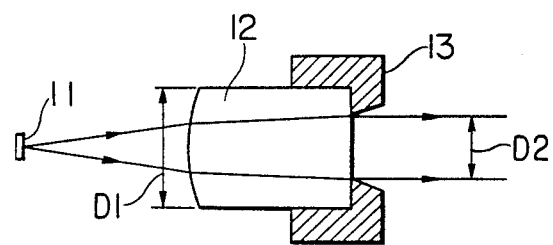
FIGS. 2 and 3 show embodiments of the light source device according to the present invention.

FIG. 2 is a schematic view showing an embodiment of the light source device of the present invention. In FIG. 2, reference numeral 11 designates a semiconductor laser, reference numeral 12 denotes a refractive index distribution type lens made with the term up to $h_6$ of equation (1) controlled during its manufacture, and reference numeral 13 designates a stop mounted on the lens 12. D1 indicates the diameter of the refractive index distribution type lens 12, and D2 indicates the effective diameter of the collimated light beam. The light beam from the semiconductor laser 11 is collimated by and emerges from the refractive index distribution type lens 12. At this time, the stop 13 for limiting the diameter of the light beam from the lens 12 is provided on the exit surface of the lens 12, and the diameter D2 of this stop is smaller than the diameter D1 of the lens 12. This is because, as described above, during the manufacture of a lens having a refractive index distribution, it is very difficult to control the high order terms of the refractive index distribution and even if such control is possible, mass producibility is poor. Therefore, the refractive index distribution type lens is made so as to have an aperture greater than the actually used aperture and instead, a light-intercepting member for limiting the lens diameter is provided to define the actually used aperture. Also, this stop can intercept the ghost light created around the lens 12.

Figure 3:
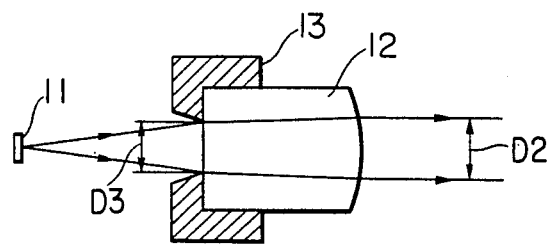

FIG. 3 shows an embodiment of the light source device in which the stop 13 is provided on that surface of the lens 12 which the light beam from the semiconductor laser 11 enters. In this case, the diameter D3 of the stop 12 is so selected that the diameter D2 of the collimated light beam assumes a desired value.

In the light source devices shown in FIGS. 2 and 3, the stop is provided on the planar surface of the refractive index distribution type lens 12, but the surface on which the stop is provided need not always be planar. However, it is mechanically easier to maintain the mutual positional relation between the refractive index distribution type lens 12 and the stop 13 that the surface on which the stop is provided be planar.

Figure 4A:
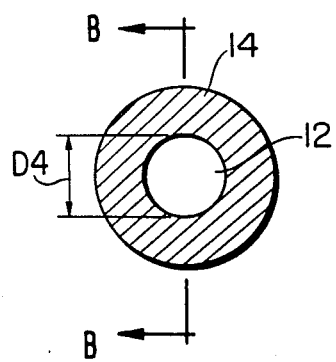
FIGS. 4A and 4B show an embodiment of the barrel for supporting the refractive index distribution type lens with FIG. 4A being a front elevational view and FIG. 4B being a vertical cross-sectional view taken on plane B—B in FIG. 4A.
Figure 4B:
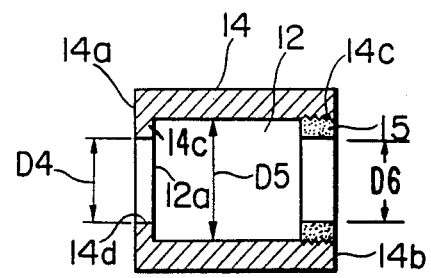

FIGS. 4A and 4B show an example in which the barrel of the refractive index distribution type lens is utilized as the stop, FIG. 4A being a view of the lens as seen from the front thereof and FIG. 4B being a cross-sectional view of the lens as seen from a side thereof. In FIGS. 4A and 4B, reference numeral 14 designates a barrel for holding the refractive index distribution type lens 12 and, as shown in FIG. 4B, the diameter D4 of the opening in the end surface 14a defined in a flange 14c on which the light beam from the light source is incident is set to a value smaller than the inner diameter D5 of the barrel 14 having a value substantially equal to the diameter of the refractive index distribution type lens. On the other hand, the other end 14b of the barrel 14 has an opening having a diameter slightly larger than the inner diameter D5, and the inner surface 14c of the barrel which is adjacent to the end surface 14b is formed with thread grooves. The refractive index distribution type lens 12 is inserted from the opening in the end surface 14b until it arrives at the flange 14c of the other end surface 14a of the barrel 14. Thereafter, a doughnut-shapted screw 15 is threadably engaged with the thread grooves 14a and the lens 12 is fixed by this screw 15. The light beam from the light source (not shown) is limited by the diameter D4 of the opening in the entrance side surface 14a. In some cases, the light beam may be limited by the diameter D6 of the opening in the entrance side doughnut-shaped screw 15. In the above-described embodiment, the light beam is caused to enter from the end surface 14a side, but the light beam may of course be caused to enter from the end surface 14b side.

In this manner, by the opening portion for stopping down the aperture of the lens being formed integrally with the lens barrel unit, the alignment between the lens and the light source unit can be accomplished by effecting the alignment between the barrel unit and the light source unit, and such alignment between the barrel unit and the light source unit can be mechanically and structurally accomplished with ease and high accuracy and thus, the position adjustment in assembling the product becomes very easy.

Figure 5A:
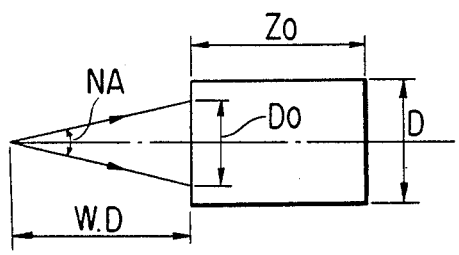
FIGS. 5A and 5B show an embodiment of the refractive index distribution type lens used in the present invention with FIG. 5A being a schematic view and FIG. 5B showing certain of its characteristics.

An specific embodiment of the refractive index distribution type lens used in the present invention will now be described. The lens has its opposite end surface formed by planar surfaces, as shown in FIG. 5A. In FIG. 5A, $Z_0$ represents the length of the lens in the direction of its optic axis, D represents the diameter of the lens, $D_0$ represents the value of ½ of the used diameter of the lens, WD represents the spacing between the end surface of the lens and the light source, and NA represent the numerical aperture of the light beam of the greatest incidence angle which enters the lens. $n_0$, $h_4$ and $h_6$ are the constants of equation (1), and the wavelength of the light beam used is 633 nm.

EXAMPLE 1

$Z_0=6.856$, $D=2.962$, $D_0=1.0$,
$WD=0.385$, $N_0=1.631$, $g=0.210$,
$h_4=0.77$, $h_6=-0.7$, $NA=0.334$

EXAMPLE 2

$Z_0=4.500$, $D=2.962$, $D_0=1.0$,
$WD=2.110$, $n_0=1.631$, $g=0.210$,
$h_4=0.77$, $h_6=-0.7$, $NA=0.270$

Figure 5B:
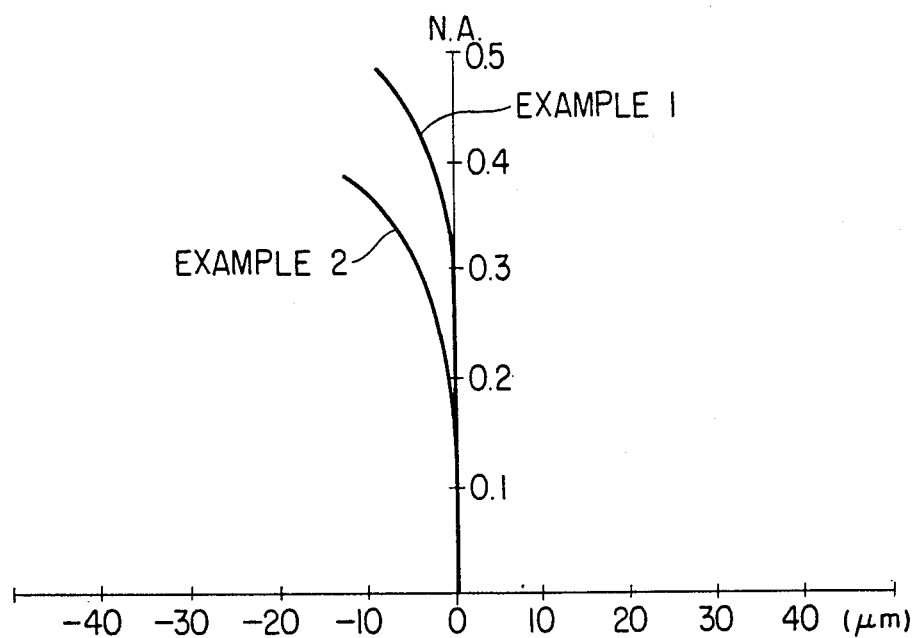

The spherical aberrations of Examples 1 and 2 are shown in FIG. 5B. As shown in FIG. 5B, it is seen that both lenses exhibit a good imaging characteristic within said range of the value of NA.

As described above, in the present invention, aberrations can be minimized by a simple method and ghost light can be intercepted. Moreover, the manufacture can be accomplished easily and the product has an excellent effect.

What we claimed is:

1. A method of providing a collimated a light source comprising the steps of:

manufacturing a refractive index distribution type lens the refractive index of which on the optic axis is $n_0$ and the refractive index n(r) of which at a position spaced by a distance r from the optic axis is represented by $$n^2(r)=n_0^2\{1-(gr)^2+h_4(gr)^4+h_6(gr)^6+h_8(gr)^8+ \ldots \}$$

where g, $h_4$, $h_6$, $h_8$, ... are constants, while controlling the terms up to $h_6(gr)^6$;
   providing light beam emitting means;
   providing a member for intercepting a light beam emitted from the light beam emitting means and passing through a marginal portion, spaced from the optic axis, of said manufactured refractive index distribution type lens; and
   setting the positional relationship among the light beam emitting means, the lens, and the intercepting member such that the light beam passing through the marginal portion of the lens is prevented from mixing with a collimated light beam emerging from the lens.

2. A light source device comprising:
   light beam emitting means for emitting a light beam;
   a refractive index distribution type lens disposed at a position for receiving the light beam emitted from said light beam emitting means and having a refractive index gradually varying along a direction orthogonal to an optic axis of said lens, said lens collimating the light beam from said light beam emitting means; and
   a member for intercepting a portion of light beam passing through a marginal portion of said refractive index distribution type lens, said member having an opening portion smaller than an aperture of said refractive index distribution type lens, the positional relationships among said light beam emitting means, said lens, and said intercepting member being set such that the portion of the light beam passing through said marginal position is prevented from mixing with a collimated light beam emerging from said lens.

3. A light source device according to claim 2, wherein said light-intercepting member is provided on the light beam entrance side of said refractive index distribution type lens.

4. A light source device according to claim 2, wherein said light-intercepting member is provided on the light beam exit side of said refractive index distribution type lens.

5. A light source device comprising:
   a semiconductor laser for emitting a light beam;
   a refractive index distribution type lens for collimating the light beam emitted from said semiconductor laser, the refractive index distribution of said lens being such that the refractive index on the optic axis thereof is $n_0$ and the refractive index $n(r)$ thereof at a position spaced by a distance r from the optic axis is represented by $$n^2(r) = n_0^2\{1 - (gr)^2 + h_4(gr)^4 + h_6(gr)^6 + h_8(gr)^8 + \ldots\}$$

where $g, h_4, h_6, h_8, \ldots$ are constants, said lens being manufactured with the terms up to $h_6(gr)^6$ being controlled; and light-intercepting means having an opening portion smaller in size than an aperture of said refractive index distribution type lens, said light-intercepting means intercepting the light beam passing through a marginal portion, spaced from the optic axis, of said refractive index distribution type lens, the positional relationships among said semiconductor laser, said lens, and said light intercepting means being set such that the portion of the light beam passing through said marginal portion is prevented from mixing with the collimated light beam emerging from said lens.

* * * * *